UNITED STATES PATENT OFFICE.

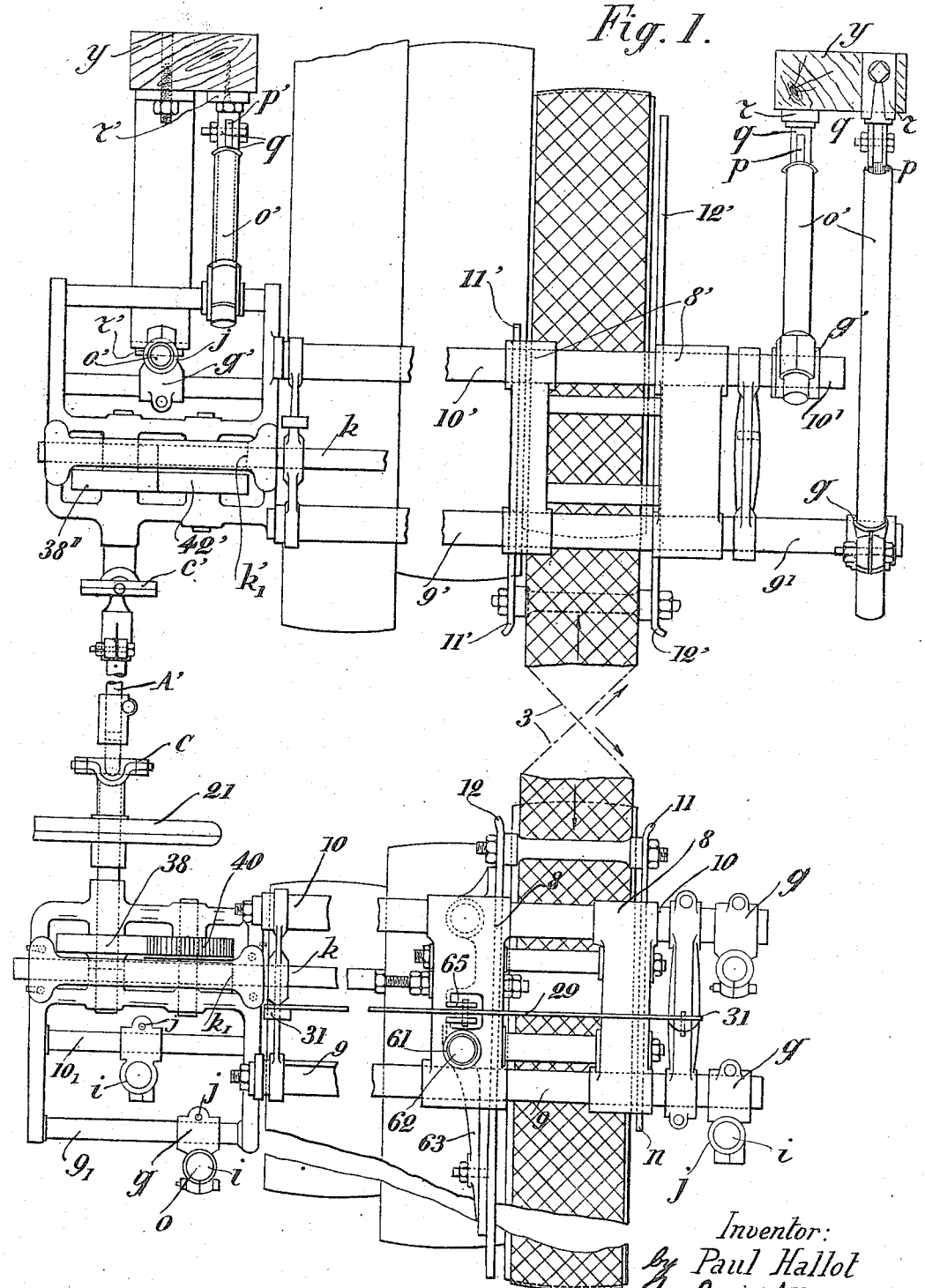

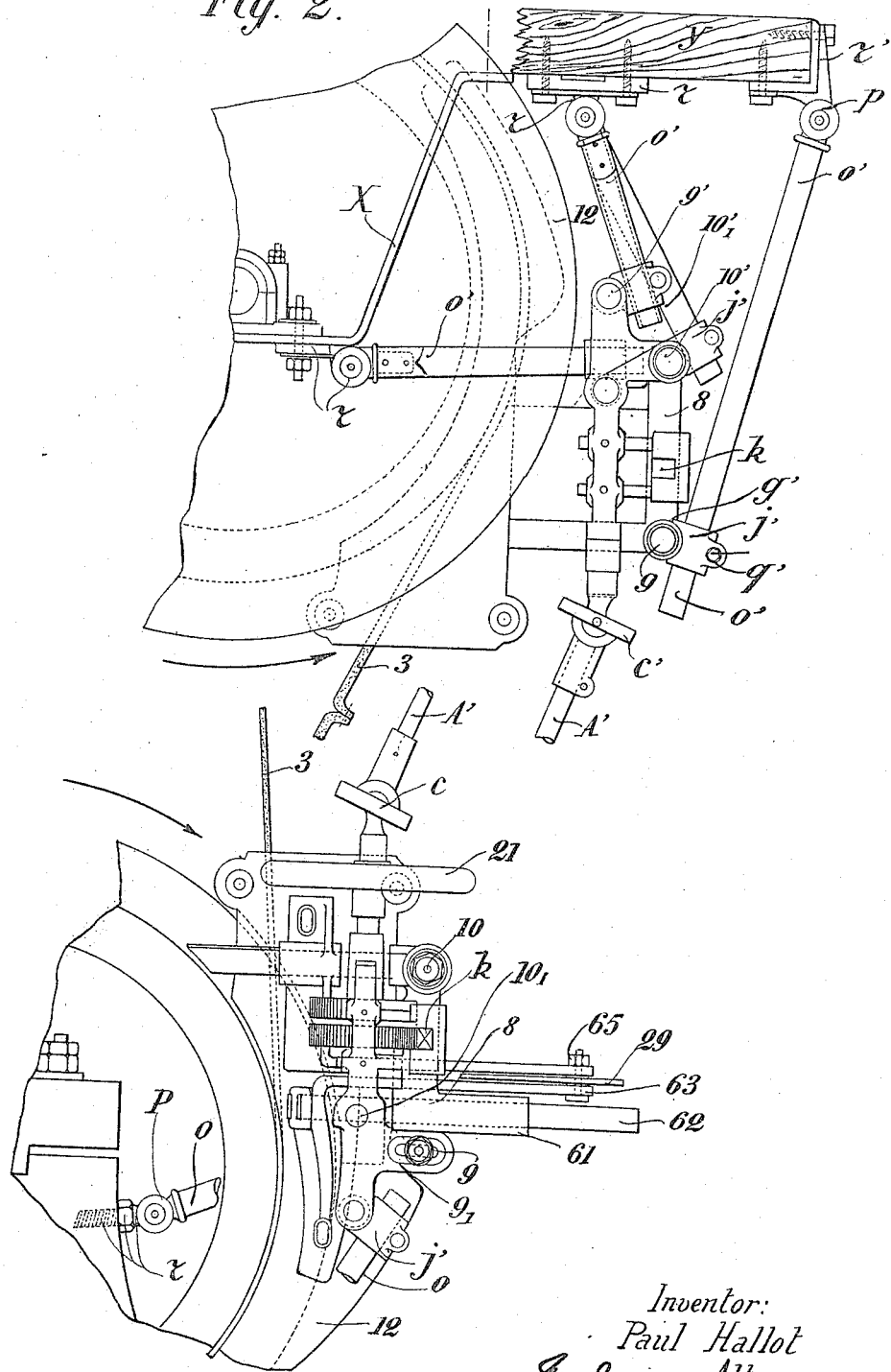

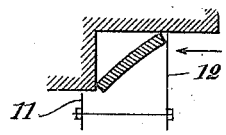
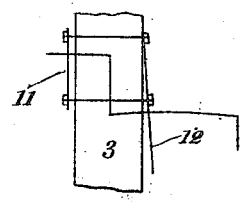
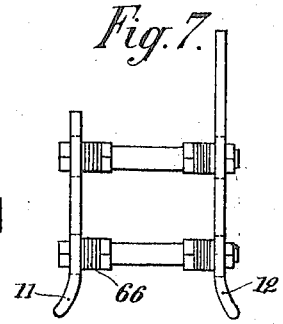
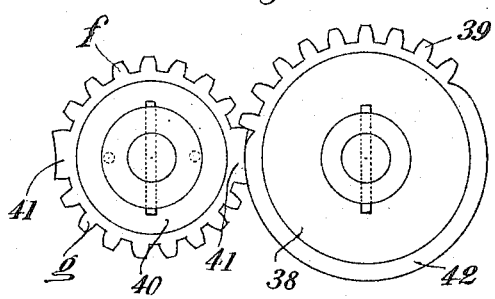
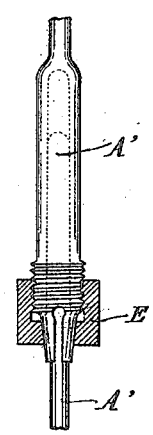
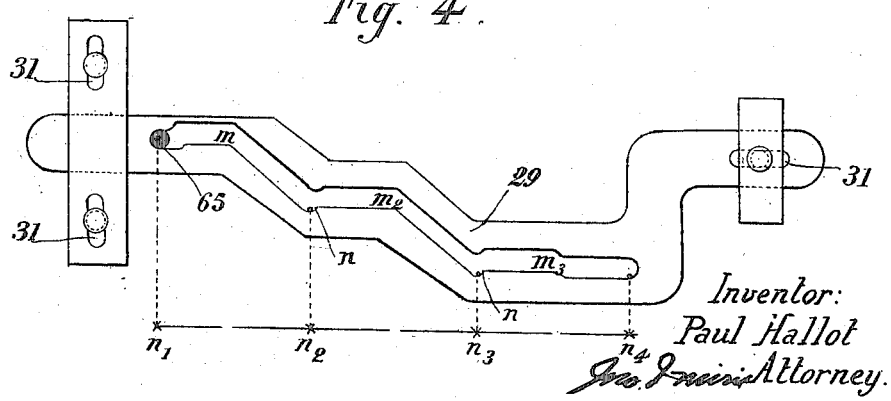

PAUL HALLOT, OF PARIS, FRANCE.

CHANGE-SPEED-GEAR APPARATUS.

1,202,835.

Specification of Letters Patent.　　Patented Oct. 31, 1916.

Original application filed March 23, 1914, Serial No. 826,750. Divided and this application filed October 21, 1915. Serial No. 57,106.

*To all whom it may concern:*

Be it known that I, PAUL HALLOT, a citizen of the French Republic, and resident of Paris, France, have invented certain new and useful Improvements in Change-Speed-Gear Apparatus, of which the following is a specification.

The present invention which is divided out from my application No. 826,750 filed March 23, 1914, relates to a change speed gear of the class described in said application, and is intended to be applied more specially to powerful machines such as lathes and the like.

The apparatus forming the object of the present invention is removably mounted on any machine by means of particular, adjustable fastening means in such a manner that one of such apparatus bought in a store may directly be fastened to any machine by its own means, without the interposition of any other fastening elements.

Another characteristic feature of the apparatus consists in that the belt shifting organs are moved first in the direction of the axis of the stepped cones or pulleys and then in a radial direction with respect to said axis, by means of particular mechanisms forming part of the invention.

A further characteristic feature of the apparatus consists in the particular means for operating the said mechanisms.

In the accompanying drawing: Figure 1 is a side view of two sets of stepped pulleys to which the apparatus is applied. Fig. 2 is a front view corresponding to Fig. 1. Fig. 3 is a top view of the means for operating the moving mechanism of the belt shifting plates. Fig. 4 is a view of the guide plate of the belt shifting plate device. Figs. 5 and 6 are diagrams showing how the belt is brought from one step to an upper one. Figs. 7 and 8 are details.

Referring to Figs. 1 and 2, 11 and 12 are the belt shifting plates mounted upon carriage 8 which in turn is laterally slidable upon guide tubes 9 and 10 removably fastened onto a fixed part of the machine as it will be explained later on. To the shifting plates 11 and 12 are imparted two different motions, one in the direction of a radius of the stepped pulleys, the other in the direction of the axis of the pulleys. The last named motion is produced by means of a rack $k$ operated by a pinion $k^1$ and secured to the carriage 8, while the motion in a radial direction is produced by means of a guiding roller 65 connected to the shifting plate 12 by means of an iron plate 63 and horizontally directed in a guide plate 29 which has guides forming a slot $m$, $m^2$, $m^3$ corresponding to the profile of the steps (Fig. 4), cut through it, whereby the belt is pushed and shifted by plates 11, 12 into any desired position on the stepped cone. The belt is first pushed parallel to the axis of the stepped cone while the roller 65 moves through a horizontal portion of the slot, (Fig. 4), corresponding to half the width of a step, after which it is slid over the edge of the adjacent pulley during the remaining displacement through an inclined portion of the slot. Such radial displacement of roller 65 with respect to the pulleys may be obtained by any convenient device; for instance a guide tube secured on shifting plate 12 is slidably engaged in a tubular guide 61. The horizontal guide plate 29 (Fig. 4) has its ends provided with slots 31 to enable a perfect adjustment of its position with respect to the series of pulleys in front of which it is located. In the guide slots of plate 29 are provided recesses $n$ which enable the roller to rest therein when in position before a pulley, thus allowing a slight backward movement of the shifting plates when the apparatus is at rest.

Now I will explain how the motion is imparted to pinions $k^1$, it being observed that both sets of shifting plates 11, 12 and 11', 12' should be alternately operated, independently from each other. To time and insure of the proper operation of the pinions $k^1$, I employ two mutilated gears 38 and 40, shown clearly in Fig. 3. On a portion of the periphery of the gear 38, are teeth 39, the remaining portion of the periphery being plain as shown at 42. The gear 40 is provided on its circumference with two sets of substantially diametrically disposed sets of teeth $f$ and $g$, the number of each set of said teeth equaling the number of teeth 39 on the gear 38. The two sets of teeth $f$ and $g$ are separated by plain peripherical portions 41, each of which is slightly concaved to receive the plain peripherical portion 42 of the gear 38. The gears 38 and 40 are so proportioned that a complete revolution of a hand wheel 21 will, through the parts described, slide the carriage 8 laterally, and cause the slot in bar 29 to move the frame carrying the belt plates, and thus transfer the belt from one pulley to the other. One wheel 38 meshes with one wheel 40 which is keyed to the shaft of pinion $k^1$ operating the rack $k$. The wheels 38, 38' each corresponding to a belt shifting device, are displaced 180 degrees with respect to each other. The shaft of wheel 38 is connected by means of a universal joint $c$ to a connecting rod $A^1$ having its opposite end connected by means of a similar joint $c^1$ with the shaft of wheel 38' (corresponding to the upper set of shifting plates 11', 12'). Owing to such arrangement both wheels 38, 38' may be operated by one single hand operated wheel 21, which alternately operates the upper and lower belt shifting plates, whatever may be the distance between the driving and driven shaft of the machine as only the dimensions of the rod $A^1$ differ according to such distance. It may occur that only one of both sets of belt shifting plates should be operated (for instance when the belt should be shifted on the smallest steps for tightening or repairing same); this may be done by hand after untightening the lower joint $c$ or the nut E (Fig. 8).

Fig. 5 is a diagrammatic horizontal section through the axis of the stepped pulleys explaining how the belt is shifted from one pulley to the adjacent larger one.

Fig. 6 is a diagram showing a characteristic feature of the invention illustrating the upper portion of the larger plate 12 conveniently inclined toward the free portion of the belt in order that, whatever may be the tension of the belt, the latter is applied against the edge of the pulley, whereby it steps quickly upon the larger pulley.

Fig. 7 shows the shifting plates 11 and 12 bolted together, use being made of washers 66 for varying the distance between the plates according to the width of the belt.

Each set of removable change gear devices is fastened in front of the corresponding stepped cone by adjustable means which will now be described.

The hollow supporting rods 9, 10, $9^1$, $10^1$ are provided at their ends with smaller rods $9_1$, $10_1$, $9'_1$, $10'_1$, having adjusting members $g$, formed of sockets $i$ and $j$ at 90 degrees, whereby they are enabled to move freely along the supporting rods $o$, $o^1$, while at the same time said sockets are enabled to slide on the tubes 9, 10, $9^1$, $10^1$. Tubes $o$, $o^1$ are provided with suitable members having eyes $p$ and ears $q$ and fastening pieces $r$ by means of which the devices may be secured upon fixed parts of the machine such as frames or beams $y$ or the like.

Having now fully described my said invention, what I claim and desire to secure by Letters Patent, is:

1. A removable change speed gear apparatus to be used with any machine having a series of stepped pulleys and a belting, said apparatus comprising two vertical and parallel arc shaped plates, a carriage supporting said plates and laterally movable across the series of stepped pulleys, guiding rods adjacent the stepped pulleys, said carriage mounted laterally slidable upon said rods, means for sliding said carriage and plates, consisting of a rack fastened at one end to the said carriage, means for operating said rack, a slotted guide plate the slot of which corresponds to the profile of the series of stepped pulleys before which they are placed, said slot being laterally enlarged for enabling the carriage to rest in position before a pulley and means for fastening the apparatus on a fixed part of the machine.

2. A removable change speed gear apparatus to be used with any machine having a series of stepped pulleys and a transmission belt, said apparatus comprising two vertical and parallel arc-shaped shifting plates in front of each set of stepped pulleys, a carriage supporting said plates and laterally movable across the series of stepped pulleys, guiding rods adjacent the stepped pulleys, said carriage mounted laterally slidable upon said rods, means for sliding said carriage and plates, consisting of a rack fastened at one end to the said carriage, a pinion engaging said rack, means for operating said pinion, consisting of a gear wheel having one toothed portion and a flat portion, a gear wheel in engagement with the first named gear wheel having two toothed portions separated by two flat portions, and keyed on the shaft of said pinion, a hand operated wheel, a rod connecting the shafts of said hand operated wheel and the first named gear wheel, by the intervention of universal joints, a slotted guide plate the slot of which corresponds to the profile of the series of stepped pulleys before which they are placed and means for fastening said apparatus on a fixed part of the machine.

3. A removable change speed gear apparatus to be used with any machine having a series of stepped pulleys and a transmission belt, said apparatus comprising two vertical and parallel arc-shaped shifting plates in front of each set of stepped pulleys, a carriage supporting said plates and laterally movable across the series of stepped pulleys, guiding rods adjacent the stepped pulleys, said carriage mounted laterally slidable upon said rods, means for sliding said carriage and plates, consisting of a rack fastened at one end to the said carriage, a pinion engaging said rack, means for operating said pinion, consisting of a gear wheel having one toothed portion and a flat portion, a gear wheel in engagement with the first named gear wheel having two toothed portions separated by two flat portions, and keyed on the shaft of said pinion, a hand operated wheel, a rod connecting the shafts of said hand operated wheel and the first named gear wheel, by the intervention of universal joints, a slotted guide plate the slot of which corresponding to the profile of the series of stepped pulleys before which they are placed and means for fastening said apparatus on a fixed part of the machine, said means comprising tubular supporting rods, ferrules at one end of said rods, eyes and ears on said ferrules, fastening members in combination with said ferrules for fastening said tubular supporting rods to fixed parts of the frame or machine, tubular extensions on the guide-rods of the shifting plates supporting carriage, adjusting collars formed of normally projecting sockets on said extensions, said sockets slidable along said extensions and said tubular supporting rods for removably connecting the free ends of said supporting rods with the said members of the apparatus.

4. An apparatus of the class described, comprising two sets of plates, a stationary frame adjacent each set of plates, a cam plate mounted on each stationary frame, a carriage mounted on each stationary frame, a connection between each carriage and the adjacent cam plate, a shaft between the two stationary frames, and gears between said shaft and the two carriages whereby when the shaft is rotated the carriages will slide on said stationary frames and the cam plates will move the two sets of plates toward or from the stationary frames.

5. In an apparatus of the class described, the combination of pulleys, of two sets of belt shifting plates, means for moving said plates toward and from the pulleys and simultaneously sliding said plates, said means including fixed plates, each having a cam slot, the walls of which have straight portions offset from each other, and connections extending from said slots to said plates, a rack connected to each set of plates, and gears which mesh with the racks.

6. In an apparatus of the class described, the combination of pulleys, of two pairs of belt plates, means for shifting said plates toward and from the pulleys and simultaneously sliding said plates, said means including a plate having a continuous cam slot having straight portions offset from each other, and a device carried by the plates coöperating with the slot to move the plates toward and from the pulleys.

In testimony whereof I have hereunto set my hand in presence of two witnesses.

PAUL HALLOT.

Witnesses:
 CHAS. P. PRESSLY,
 C. E. VAN VELSON.

Copies of this patent may be obtained for five cents each, by addressing the "Commissioner of Patents, Washington, D. C."